United States Patent [19]

Cymbal

[11] 4,218,073
[45] Aug. 19, 1980

[54] ELECTRICAL CONNECTOR ARRANGEMENT FOR MOTOR VEHICLE STEERING ASSEMBLY

[75] Inventor: William D. Cymbal, Freeland, Mich.

[73] Assignee: General Motors Corporation, Detroit, Mich.

[21] Appl. No.: 947,169

[22] Filed: Sep. 28, 1978

[51] Int. Cl.² ............................................. B60R 21/00
[52] U.S. Cl. .................................... 280/731; 280/735; 339/3 S
[58] Field of Search ............... 280/728, 731, 734, 735, 280/750, 751, 753; 339/3 R, 3 S, 5 M, 5 S

[56] References Cited

U.S. PATENT DOCUMENTS

| 1,366,552 | 1/1921 | Blackburn | 339/3 S |
| 1,480,656 | 1/1924 | Blackburn | 339/3 S |
| 3,525,536 | 8/1970 | Pruneski | 280/731 |
| 3,876,272 | 4/1975 | Tsutsumi et al. | 339/3 S |
| 4,063,789 | 12/1977 | Kreisl | 339/3 S |

Primary Examiner—John J. Love
Assistant Examiner—Michael Mar
Attorney, Agent, or Firm—Edward J. Biskup

[57] ABSTRACT

An electrical connector arrangement for a motor vehicle steering assembly that includes a steering shaft having an insulator member mounted thereon. A pair of conductor rings are supported by the insulator member and are adapted to be electrically connected to an occupant restraint cushion and to rotate with the steering shaft. The conductor rings cooperate with a pair of contact members fixed with the steering column member so as to provide current to the conductor rings upon operation of a sensor for actuating an occupant restraint cushion.

3 Claims, 12 Drawing Figures

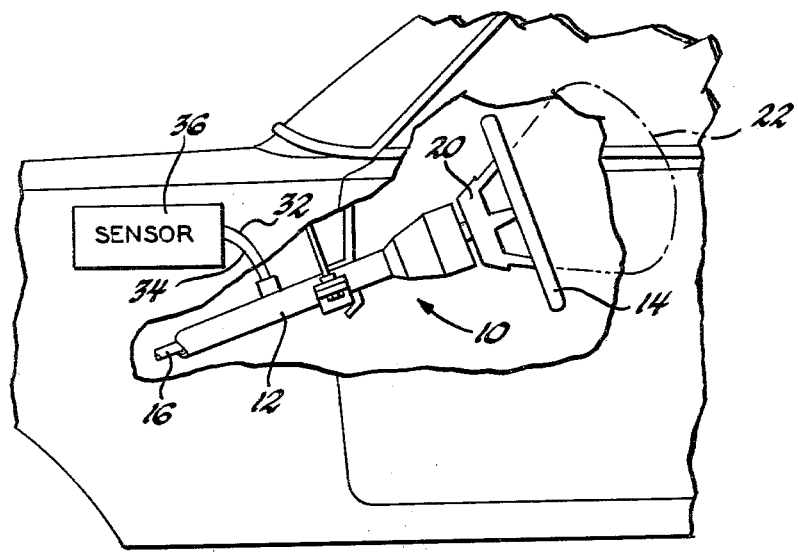
Fig. 1
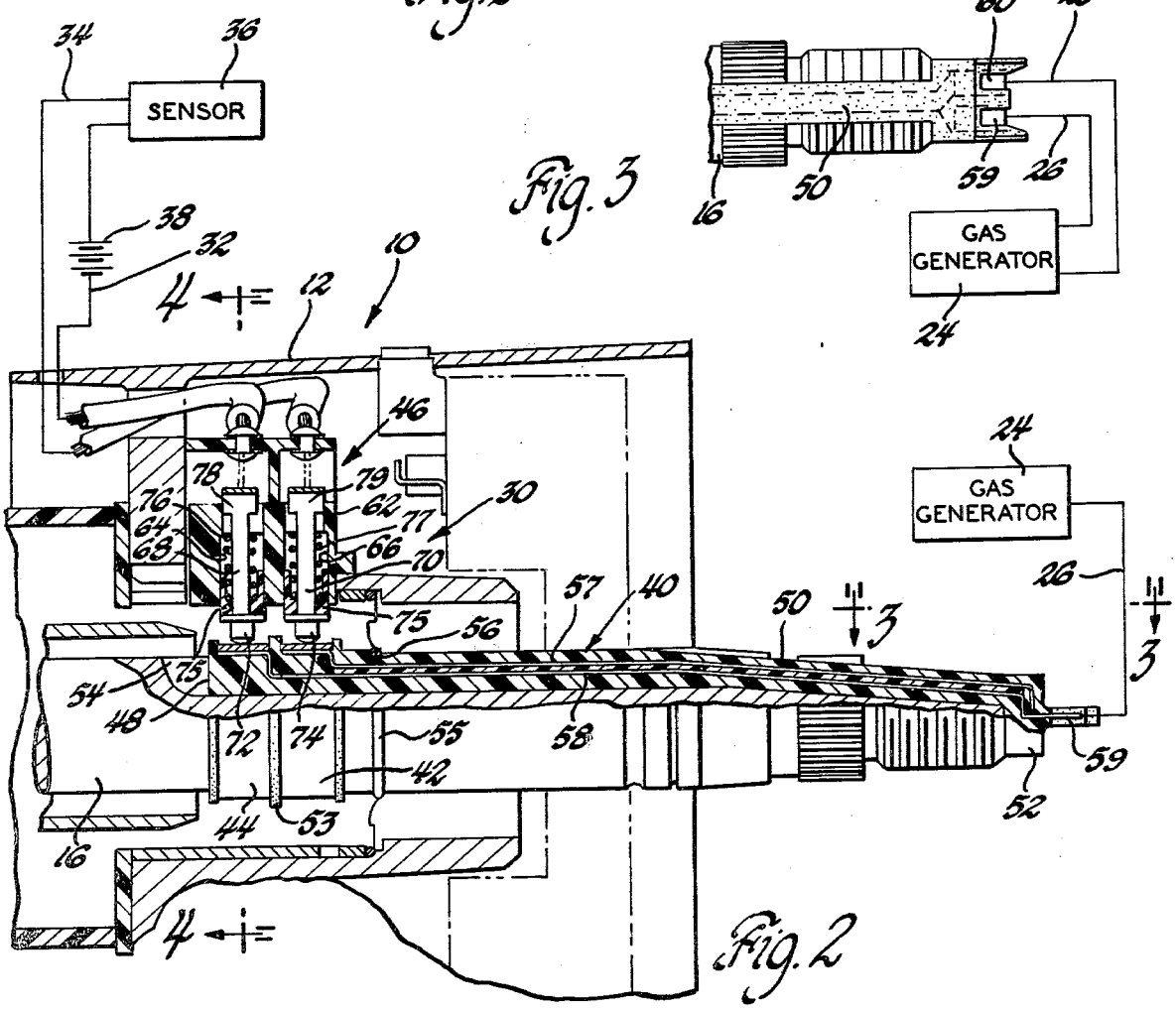
Fig. 3
Fig. 2

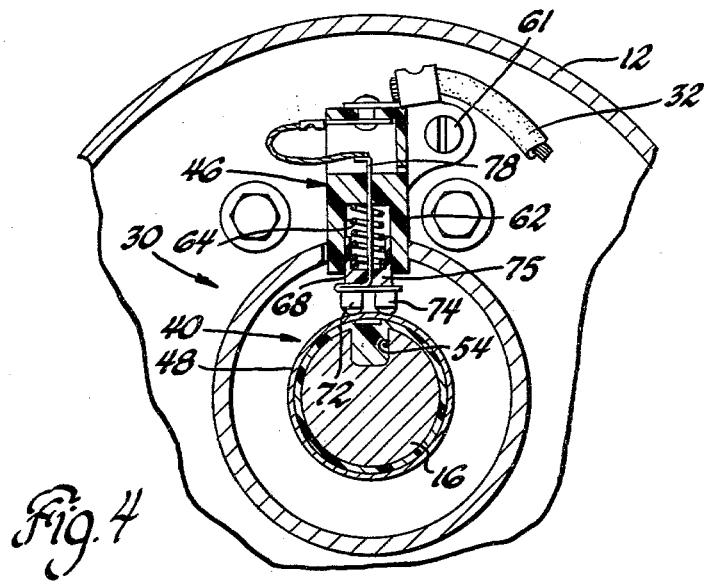
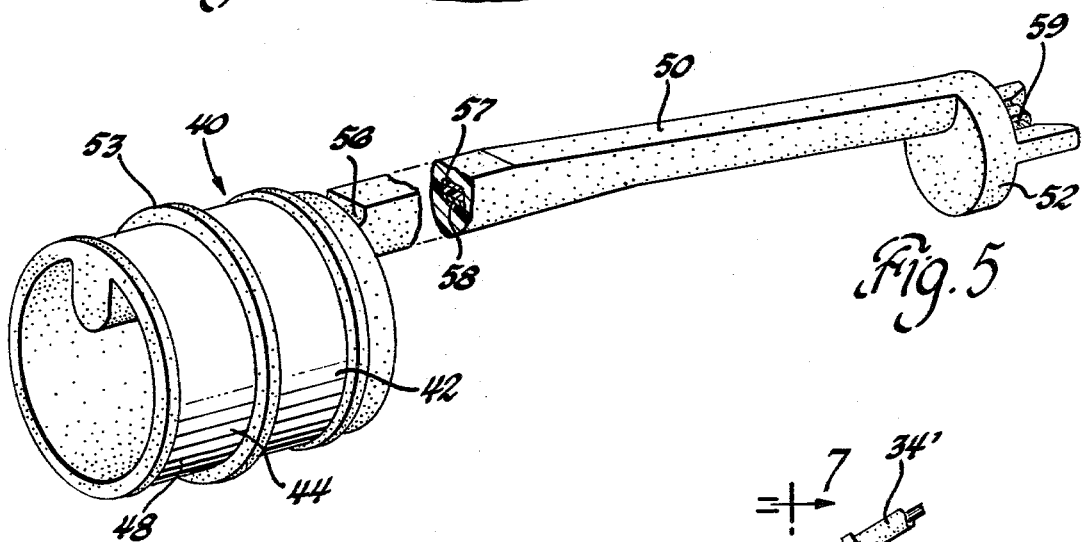
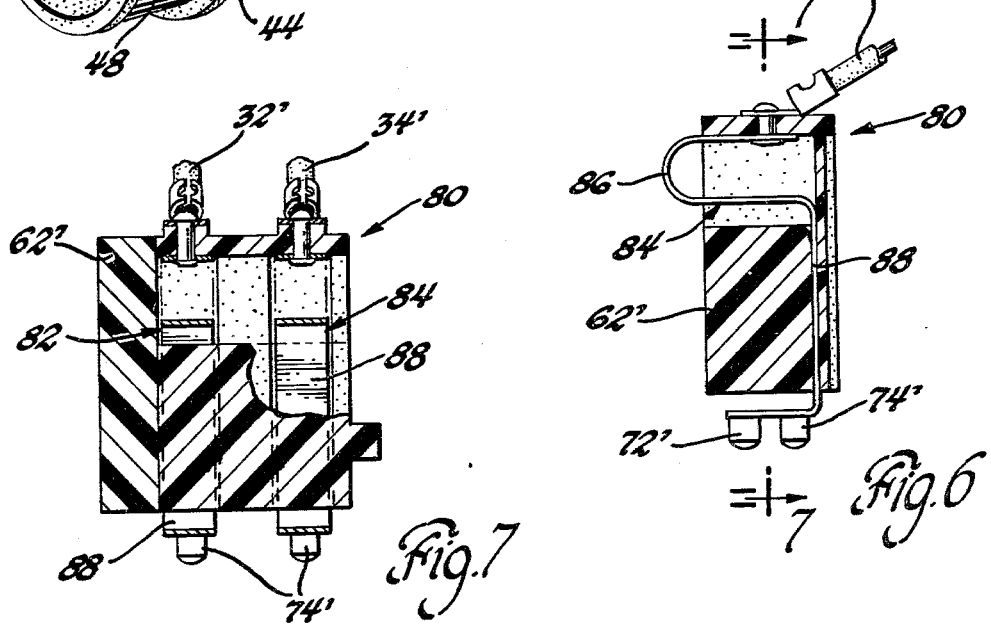

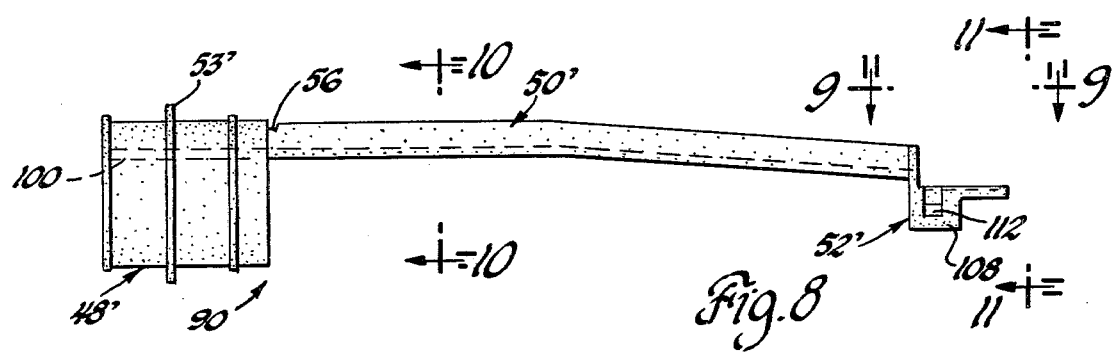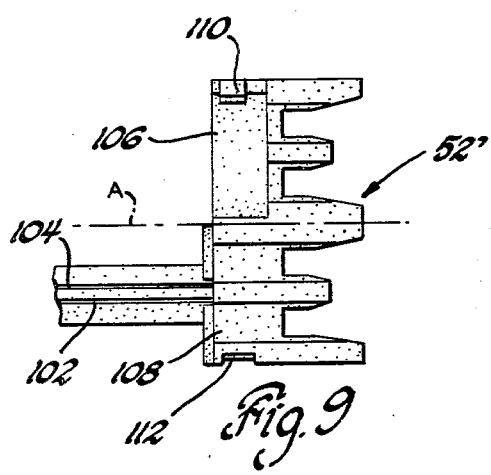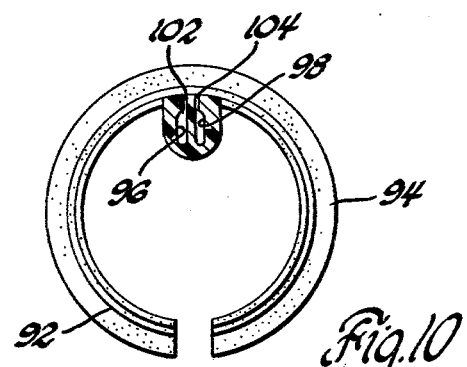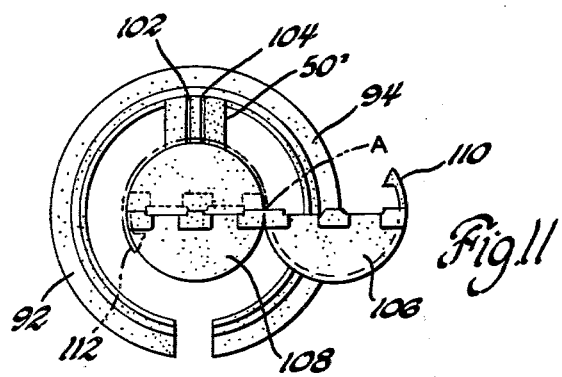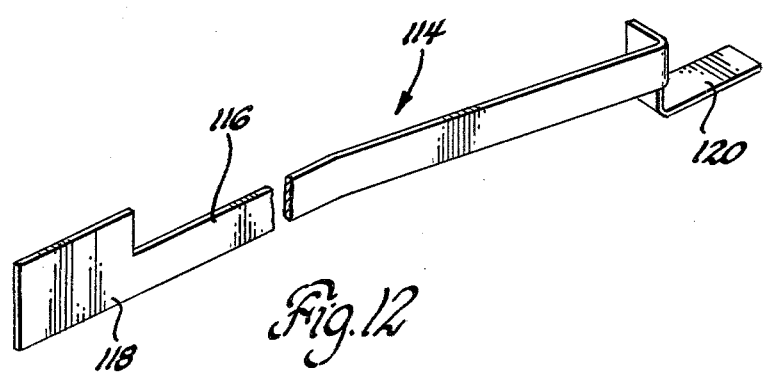

ELECTRICAL CONNECTOR ARRANGEMENT FOR MOTOR VEHICLE STEERING ASSEMBLY

This invention concerns a steering wheel occupant restraint cushion system, in general, and more particularly relates to an electrical connector arrangement for such system that is interposed between the steering column and the steering shaft for allowing relative movement therebetween while continuously providing electrical continuity between a sensor and an occupant restraint cushion mounted in the steering wheel.

My copending patent application Ser. No. 883,697, filed on Mar. 6, 1978, and assigned to the assignee of this invention, discloses an electrical connector arrangement that is combined with a motor vehicle steering assembly which includes a steering column member that rotatably supports a steering shaft fixed with a steering wheel having an occupant restraint cushion mounted therein. The vehicle is provided with a sensor for actuating the occupant restraint cushion and the electrical connector arrangement is interposed between the steering column and the steering shaft for allowing relative movement therebetween while continuously providing electrical continuity between the sensor and the occupant restraint cushion. The electrical connector arrangement includes an insulator sleeve that is carried by the steering shaft and has mounted thereon a pair of conductor rings which are electrically connected to the occupant restraint cushion through conductors that extend through a passage centrally formed in the steering shaft. A pair of flexible contact members are fixed with the steering column member for continuously maintaining engagement with the tracks in the conductor rings and serve to provide current to the conductor rings upon operation of the sensor.

The present invention is directed to an electrical connector arrangement such as described above that differs therefrom in that the insulator member is made as a preform for supporting the conductor rings. The insulator member includes a tail portion that fits within a groove formed in the outer surface of the steering shaft and serves to carry the conductors for electrical connection with the occupant restraint system. This design facilitates assembly of the conductor rings to the steering shaft and also increases the torsional strength of the steering shaft. Another feature of the invention is the use of a pair of contact members each of which includes a pair of contact buttons that are biased into engagement with one of the conductor rings by a spring member. The spring is of sufficient strength to maintain good electrical contact between the contact member and the associated conductor ring during high humidity-extremely low temperature conditions when there is a tendency for frost to form on the conductor rings.

The objects of the present invention are to provide a new and improved electrical connector assembly for a motor vehicle steering wheel occupant restraint cushion that uses a pair of spaced conductor rings that are fixed with the shaft portion of the steering wheel and cooperate with a pair of spring-pressed contact members connected to the stationary steering column for providing electrical continuity between a sensor and a gas generator which forms a part of the occupant restraint cushion; to provide a new and improved contact arrangement for maintaining electrical continuity between relatively rotatable members and includes a pair of conductor rings and a pair of contact members each of which has a pair of button contacts which engage an associated conductor ring with sufficient pressure to assure that frost which may be formed on the conductor rings during cold weather does not disrupt electrical continuity; and to provide a new and improved electrical connection between relatively rotatable members wherein one of the members is a steering wheel shaft that supports a pair of spaced conductor rings mounted on a preformed insulator member which include a cylindrical portion and an integral tail section that fits within a groove in the outer surface of the steering wheel shaft while the other member is a stationary steering column that has button-like contact members that are spring-pressed into engagement with the conductor rings.

Other objects and advantages of the invention will be more apparent from the following detailed description when taken with the drawings in which:

FIG. 1 is an elevation view showing a steering wheel assembly incorporating an electrical connector arrangement made according to the invention;

FIG. 2 is an enlarged view showing the electrical connector arrangement incorporated with the steering wheel assembly of FIG. 1;

FIG. 3 is a view taken on line 3—3 of FIG. 2;

FIG. 4 is a sectional view taken on line 4—4 of FIG. 2;

FIG. 5 is a perspective view showing the insulator member employed with the electrical connector arrangement disclosed in the above-mentioned Figures;

FIG. 6 is a modified form of the contact members incorporated with the invention as disclosed in FIGS. 1-4;

FIG. 7 is a view taken on line 7—7 of FIG. 6;

FIG. 8 is a modified form of the insulator member that can be incorporated with the invention as shown in FIGS. 1-4;

FIG. 9 is a view of the terminal section of the insulator member of FIG. 8 taken on line 9—9 thereof;

FIG. 10 is a sectional view of the tail section of the insulator member of FIG. 8 taken on line 10—10 thereof;

FIG. 11 is an end view of the terminal section taken on line 11—11 thereof; and

FIG. 12 is a perspective view showing one of the conductors that is adapted to be mounted in the insulator member of FIGS. 8-11.

Referring to the drawings and more particularly FIG. 1 thereof, a vehicle is shown having the usual steering column assembly 10 that includes an electrical connector arrangement made in accordance with the invention. The steering column assembly 10 is provided with a fixed tubular steering column member 12 the upper portion of which has a steering wheel 14 mounted thereon. The steering wheel 14 is fixedly connected to the upper end of a steering shaft 16 that extends axially within and is rotatably supported by the steering column member 14. The lower end of the steering shaft 16 is connected to the steering gear (not shown) in a conventional manner so that the steering wheel 14 can be turned and thereby turn the dirigible wheels of the vehicle.

In this case, the hub portion of the steering wheel 14 supports an occupant restraint cushion system 20 with the cushion 22 thereof shown in FIG. 1 in phantom lines and in the deployed position. As seen in FIGS. 2 and 3, a gas generator 24 is a part of the occupant restraint cushion system 20 and is connected by a pair of conductors 26 and 28 to the electrical connector arrangement 30 made in accordance with the invention. In addition, it will be noted that the electrical connector arrangement 30 is connected by conductors 32 and 34 to a sensor 36 which can be positioned at the front end of a vehicle for sensing sudden deceleration such as would occur due to impact of the vehicle with an obstacle. At such time, the sensor 36 is actuated and causes a circuit to be completed with a battery 38 for energizing the gas generator 24 through the electrical connector arrangement 30.

The electrical connector arrangement 30 comprises an insulator member 40, a pair of identical conductor rings 42 and 44, and a contact assembly 46. The insulator member 40 includes a cylindrical sleeve portion 48, a tail section 50, and a terminal section 52 all of which are integral with each other and formed of a non-conducting plastic material. As seen in FIGS. 2 and 4, the conductor rings 42 and 44 are cylindrical in configuration, and are non-rotatably mounted side by side on the cylindrical sleeve portion 48 of the insulator member 40. An annular divider portion 53 serves to axially space the conductor rings 42 and 44 from each other.

The insulator member 40 is non-rotatably supported on the steering shaft 16 by having the tail section 50 located within a longitudinally extending groove 54 formed in the outer surface of the steering shaft 16. The insulator member 40 is also prevented from axial movement along the longitudinal axis of the steering shaft 16 by a split lock ring 55 which fits within an annular groove formed in the steering shaft 16 and a groove 56 formed in the tail section 50. A pair of vertically spaced conductors 57 and 58 are encapsulated within the tail section 50 and are respectively connected at one end to the conductor rings 42 and 44 while the opposite ends are bent so as to form laterally spaced terminals 59 and 60 for connection with the conductors 26 and 28 leading to the gas generator 24. Thus, from the above-description, it should be apparent that the insulator member 40 is a preform that has the conductors 57 and 58 molded therein and electrically connected to the conductor rings 42 and 44. The insulator member 40 is then mounted on the steering shaft 16 with the tail section 50 registering with the groove 54. Afterwards, the lock ring 55 is positioned in the groove 56 and the aligned annular groove in the steering shaft 16 so that upon rotation of the steering wheel 14, corresponding rotation of the steering shaft 16 occurs which, in turn, causes rotation of the conductor rings 42 and 44 mounted thereon.

The contact assembly 46 is fixedly mounted in the column 12 by a screw 61 and consists of a support housing 62 made of an insulating material such as plastic. The support housing 62 has a pair of cylindrical bores 64 and 66 formed therein which respectively accommodate contact members 68 and 70 for sliding movement along axes which are perpendicular to the longitudinal axis of the steering shaft 16. Each contact member 68, 70 is formed with a pair of spaced metallic contact buttons 72 nad 74 which are supported by a cylindrical sleeve 75 and are adapted to electrically engage the associated conductor ring. Thus, the contact buttons 72 and 74 of contact member 68 are continuously in engagement with the conductor ring 44 and the corresponding contact buttons of contact member 70 are continuously in engagement with the conductor ring 42. In this regard, coil spring members 76 and 77 in the bores 64 and 66, respectively, serve to continuously urge the associated contact members into firm engagement with the conductor rings.

As seen in FIGS. 2 and 4, sleeve 75 of the contact member 68 includes a fixed metallic strip 78 one end of which carries the contact buttons while the other end is electrically connected with the conductor 32 that leads to the sensor 36. Similarly, sleeve 75 of the contact member 70 includes a fixed metallic strip 79 which carries the associated contact buttons and is electrically connected with the conductor 34 which leads to the sensor 36. Accordingly, as alluded to hereinbefore, when the sensor 36 is actuated, a circuit is completed with the battery 38 so as to cause electrical current to flow via contact assembly 46, the conductor rings 42 and 44, and the associated conductors to energize the gas generator 24.

FIGS. 6 and 7 show a modified contact assembly 80 with the parts thereof that correspond to the parts incorporated with the contact assembly 46 being identified by the same reference numerals but primed. As best seen in FIG. 7, the contact assembly 80 includes a pair of contact members 82 and 84 which are similar to the contact members incorporated with the contact assembly 46 shown in FIGS. 1-4, except that each contact member 82, 84 consists of a strip of electrically conductive metal such as copper that is formed with a U-shaped section 86 and a straight section 88 which terminates with and rigidly supports pair of spaced contact buttons 72' and 74'. The straight section 88 of each contact member 82, 84 is located within an accommodating guide slit formed in the housing 62' so as to allow reciprocal movement thereof. In this regard, it will be noted that the U-shaped section 86 functions as a spring means for maintaining the contact member in continuous engagement with the associated conductor ring. Conductors 32' and 34' connect the contact assembly to the sensor.

FIGS. 8-12 disclose a modified form of an insulator member 90 that can be incorporated in the invention as shown in FIGS. 1-4. It will be noted that the parts of the insulator member 90 that correspond to the insulator member 40 are identified by the same reference numerals but primed. As best seen in FIG. 8, the insulator member 90 comprises a cylindrical sleeve portion 48', a tail section 50' and a terminal section 52'. The cylindrical sleeve portion 48' is substantially the same as the corresponding portion 48 of insulator member 40 except that the lower portion is split so as to provide two symmetrical arcuate parts 92 and 94 as seen in FIG. 10. Also, the tail section 50' differs from the tail section of insulator member 40 in that it is formed with two laterally spaced eliptically shaped pockets 96 and 98 which extend the length of the tail section 50' and also extend into longitudinally aligned extension 100 integrally formed with the cylindrical sleeve portion 48'. The pockets 96 and 98 connect with slits 102 and 104, respectively, which allow conductors to be inserted into the pockets as will be explained hereinafter.

The terminal section 52', in this case, is composed of two similar parts 106 and 108 with the latter being an integral extension of the tail section 50'. The part 106 is hinged to the part 108 along an axis A so as to allow the part 106 to be pivoted to the phantom line position seen in FIG. 11 so as to cause a hook shaped tab 110 to move into a recess 112 in part 108 and thereby lock the two parts 106 and 108 together.

The insulator member 90 as described above is a preform made of a plastic material such as polypropylene and, just prior to assembly to the steering shaft 16, a pair of conductors such as conductor 114 seen in FIG. 12 are mounted in the pockets 96 and 98. In this regard, it will be noted that each conductor 114 consists of an elongated body portion 116 that is formed at one end with an enlarged rectangular head portion 118 while the other end has a terminal part bent 90° to the body portion 116 and has an integral projection 120. Each conductor 114 is inserted through the slit formed in the tail section 90 into the associated pocket with the enlarged head 118 being located in the extension 100 while the projection 120 is located in the terminal section 52'. As should be apparent, one conductor 114 will be slightly longer than the other so as to allow the associated head portion 118 to make electrical contact with the conductor ring 44 while the other conductor makes electrical control with the conductor ring 42. Once the conductors 114 are properly positioned within the insulator member 90, the part 106 is pivoted to the closed position so as to trap the projections 120 in the terminal section. The conductor rings 42 and 44 are then installed on the sleeve portion 48' by compressing the parts 92 and 94 towards each other and then first slipping conductor ring 42 over divider portion 53' followed by slipping conductor ring 44 into position into the sleeve portion 48'. The insulator member 90 is then mounted as a unit on the steering shaft 16 as explained in connection with insulator member 40.

It should be apparent from the above description that the electrical connector arrangements described above provide electrical continuity between the sensor 36 and the gas generator 24 of the occupant restraint cushion 20 during all positions of the steering wheel 14. Accordingly, the steering wheel 14 can be rotated for turning the wheels of the vehicle and still maintain an electrical connection between the sensor 36 and the restraint cushion 20 so that upon operation of the sensor, the gas generator 24 can be activated for deploying the cushion within the steering wheel 14.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a motor vehicle steering assembly including a steering column member rotatably supporting a steering shaft fixed with a steering wheel having an occupant restraint cushion, said vehicle having a sensor for actuating said occupant restraint cushion, an electrical connector arrangement interposed between said steering column member and said steering shaft for allowing relative movement therebetween while continuously providing electrical continuity between said sensor and said occupant restraint cushion, said electrical connector arrangement comprising an insulator member including a sleeve portion integrally connected to an elongated tail section, said insulator member carried by said steering shaft in fixed relationship thereto, a pair of conductor rings mounted on said sleeve portion, a terminal section formed at one end of the tail section and including a pair of members movable relative to each other between open and closed positions, said tail section and said sleeve portion being formed so as to removably house a pair of conductors which electrically connect the conductor rings with the occupant restraint cushion, said conductor rings adapted to maintain one end of said pair of conductors in said sleeve portion and said pair of members adapted to maintain the other end of said pair of conductors in said terminal section when in said closed position, said conductor rings being axially spaced along said steering shaft and each conductor ring being located in a plane that is substantially perpendicular to the longitudinal center axis of the steering shaft, a pair of contact button members supported in a housing fixed with said steering column member for continuously maintaining engagement with each of the conductor rings and adapted to provide current to said conductor rings upon operation of said sensor, and spring means mounted in said housing and connected to said contact button members for urging the latter into engagement with said conductor rings.

2. In combination with a motor vehicle steering assembly including a steering column member rotatably supporting a steering shaft fixed with a steering wheel having an occupant restraint cushion, said vehicle having a sensor for actuating said occupant restraint cushion, an electrical connector arrangement interposed between said steering column member and said steering shaft for allowing relative movement therebetween while continuously providing electrical continuity between said sensor and said occupant restraint cushion, said electrical connector arrangement comprising a preformed insulator member including a sleeve portion integrally connected to an elongated tail section, an elongated groove formed in the outer surface of said steering shaft, said insulator member carried by said steering shaft with said tail section located in said groove, a pair of conductor rings mounted on said sleeve portion and adapted to be electrically connected to said occupant restraint cushion through said tail section and to rotate with said steering shaft, said conductor rings being axially spaced along said steering shaft and each conductor ring being located in a plane that is substantially perpendicular to the longitudinal center axis of the steering shaft, a housing fixed with said steering column member a pair of control button members reciprocably supported in said housing and continuously maintaining engagement with each of the conductor rings to provide current to said conductor rings upon operation of said sensor, and spring means mounted in said housing and fixedly supporting said contact button members for urging the latter into engagement with said conductor rings.

3. In combination with a motor vehicle steering assembly including a steering column member rotatably supporting a steering shaft fixed with a steering wheel having an occupant restraint cushion, said vehicle having a sensor for actuating said occupant restraint cushion, an electrical connector arrangement interposed between said steering column member and said steering shaft for allowing relative movement therebetween while continuously providing electrical continuity between said sensor and said occupant restraint cushion, said electrical connector arrangement comprising an insulator member including a split sleeve portion integrally connected to an elongated tail section, said insulator member adapted to be carried by said steering shaft in fixed relationship thereto, a pair of conductor rings mounted on said sleeve portion, a terminal section formed at one end of said tail section and having a pair of hinged members movable relative to each other between an open position and a closed position, said tail section being formed with a pair of laterally spaced pockets for housing a pair of conductors which electrically connect the conductor rings with the occupant restraint cushion, said conductor rings adapted to maintain one end of said pair of conductors in said pockets and said pair of hinged members adatped to maintain the other end of said pair of conductors in said pockets when in said closed position, said conductor rings being axially spaced along said steering shaft and each conductor ring being located in a plane that is substantially perpendicular to the longitudinal center axis of the steering shaft, a pair of contact button members supported in a housing fixed with said steering column member for continuously maintaining engagement with each of the conductor rings and adapted to provide current to said conductor rings upon operation of said sensor, and spring means mounted in said housing and connected to said contact button members for urging the latter into engagement with said conductor rings.

* * * * *